(12) United States Patent
Ansari et al.

(10) Patent No.: US 9,109,883 B2
(45) Date of Patent: Aug. 18, 2015

(54) HIGH RESOLUTION LARGE DISPLACEMENT/CRACK SENSOR

(75) Inventors: Farhad Ansari, Naperville, IL (US); Seyed Asadollah Bassam, Chicago, IL (US)

(73) Assignee: The Board of Trustees of The University of Illinois, Urbana, IL (US)

(*) Notice: Subject to any disclaimer, the term of this patent is extended or adjusted under 35 U.S.C. 154(b) by 612 days.

(21) Appl. No.: 13/320,885

(22) PCT Filed: May 28, 2010

(86) PCT No.: PCT/US2010/036571
§ 371 (c)(1),
(2), (4) Date: Nov. 16, 2011

(87) PCT Pub. No.: WO2010/138813
PCT Pub. Date: Dec. 2, 2010

(65) Prior Publication Data
US 2012/0069324 A1 Mar. 22, 2012

Related U.S. Application Data

(60) Provisional application No. 61/182,447, filed on May 29, 2009.

(51) Int. Cl.
*G01B 11/16* (2006.01)
*G01M 5/00* (2006.01)

(52) U.S. Cl.
CPC .............. *G01B 11/18* (2013.01); *G01M 5/0041* (2013.01); *G01M 5/0091* (2013.01)

(58) Field of Classification Search
CPC ........ G01H 9/006; G01H 9/004; G01L 1/246; G01B 11/16; G01B 11/165; G01K 11/3206; G01M 5/0041
See application file for complete search history.

(56) References Cited

U.S. PATENT DOCUMENTS 5,726,744 A * 3/1998 Ferdinand et al. ............. 356/32
6,384,404 B1 * 5/2002 Berg .............................. 356/32
(Continued)

FOREIGN PATENT DOCUMENTS

JP     06-084602 A    3/1994
JP     2003-065731 A  3/2003
(Continued)

OTHER PUBLICATIONS

Espacenet machine English translation of Nobuyuki et al. JP 2004-294185 from applicants IDS dated Jan. 5, 2012.*
(Continued)

*Primary Examiner* — Tarifur Chowdhury
*Assistant Examiner* — Jamil Ahmed
(74) *Attorney, Agent, or Firm* — Reinhart Boerner Van Deuren P.C.

(57) ABSTRACT

A structural displacement sensor that includes an arched member having two ends, where each end is attached to a fastening member. In an embodiment of the invention, the fastening members are configured to be attached to a structure. Further, a strain gauge is attached to the arched member, and the strain gauge is operatively connected to a signal processing device. In an embodiment, the arched member and strain gauge are configured to measure a displacement of the structure based on the amount of strain detected on the strain gauge.

19 Claims, 2 Drawing Sheets

(56) References Cited

U.S. PATENT DOCUMENTS

| | | | |
|---|---|---|---|
| 2005/0134861 A1* | 6/2005 | Kringlebotn et al. | 356/480 |
| 2008/0281209 A1* | 11/2008 | Arkwright et al. | 385/13 |
| 2009/0262331 A1* | 10/2009 | Burchardt et al. | 356/32 |
| 2011/0040497 A1* | 2/2011 | Olesen | 356/32 |

FOREIGN PATENT DOCUMENTS

| | | |
|---|---|---|
| JP | 2003-287435 A | 10/2003 |
| JP | 2003-315215 A | 11/2003 |
| JP | 2004-294185 A | 10/2004 |

OTHER PUBLICATIONS

Espacenet machine English translation of Kazunori et al. JP 2003-287435 from applicants IDS dated Jan. 5, 2012.*

Zhijun Zhang et al.; Fiber-Optic Laser Speckle-Intensity Crack Sensor for Embedment in Concrete; Science Direct Sensors and Actuators A 126; 2005; 5 pages (107-111); Elsevier B.V.

Zhijun Zhang et al.; Crack Tip Opening Displacement in Micro-Cracked Concrete by an Embedded Optical Fiber Sensor; Science Direct Engineering Fracture Mechanics 72; 2005; 14 pages (2502-2518); Elsevier Ltd.

Crack Monitoring Sensor; date printed Apr. 24, 2009; 1 page; http://www.aos-fiber.com/eng/Sensors/Cracken.html.

Torsten Thiel et al.; Autonomous Crack Response Monitoring on Civil Structures with Fiber Bragg Grating Displacement Sensors; date printed Apr. 24, 2009; 4 pages; www.neoluxinc.com/images/OFS2005-paper.pdf.

Yan Zhang et al.; A Civil Structural Monitoring System Based on Fiber Grating Sensors; Smart Structures and Materials 2003: Smart Systems and Nondestructive Evaluation for Civil Infrastructures; 8 pages; vol. 5057.

Harold Gnewuch et al.; Long Range Extensometer for Civil Structure Monitoring Using Fibre Bragg Gratings; Measurement Science and Technology; Oct. 2005; 8 pages; vol. 16, No. 10; Institute of Physics Publishing; UK.

Daniele Zonta et al.; Smart RC Elements for Long-Life Monitoring of Civil Infrastructures; Smart Structures and Materials 2005: Sensors and Smart Structures Technologies for Civil, Mechanical, and Aerospace Systems; 2005; 12 pages; vol. 5765.

Aftab A. Mufti; Structural Health Monitoring of Innovative Canadian Civil Engineering Structures; Structural Health Monitoring; 2002; 15 pages (89-103); vol. 1(1); Sage Publications.

Peter C. Chang et al.; Recent Research in Nondestructive Evaluation of Civil Infrastructures; Journal of Materials in Civil Engineering; May/Jun. 2003; 7 pages (298-304); EBSCO Publishing.

Mahmod M. Sammon et al.; Vibration Testing for Nondestructive Evaluation of Bridges. II: Results; Journal of Structural Engineering; Jan. 1994; 17 pages (290-306); vol. 120, No. 1.

Charles R. Farrar et al.; Comparative Study of Damage Identification Algorithms Applied to a Bridge: I. Experiment; Smart Mater. Struct.; 1998; 16 pages (704-719); IOP Publishing Ltd.

M. M. Abdel Wahab et al.; Damage Detection in Bridges Using Modal Curvatures: Application to a Real Damage Scenario; Journal of Sound and Vibration; 1999; 19 pages (217-235); vol. 226(2); Academic Press.

Iman Talebinejad et al.; Numerical Evaluation of Vibration-Based Methods for Damage Assessment of Cable-Stayed Bridges; Computer-Aided Civil and Infrastructure Engineering; 2011; 13 pages (239-251); vol. 26.

Kihyon Kwon et al.; Bridge Fatigue Reliability Assessment Using Probability Density Functions of Equivalent Stress Range Based on Field Monitoring Data; International Journal of Fatigue; 2010; 12 pages (1221-1232); vol. 32; Elsevier Ltd.

Samir N. Shoukry et al.; Longterm Sensor-Based Monitoring of an LRFD Designed Steel Girder Bridge; Engineering Structures; 2009; 12 pages (2954-2965); vol. 31; Elsevier Ltd.

John Leander et al.; Monitoring and Enhanced Fatigue Evaluation of a Steel Railway Bridge; Engineering Structures; 2010; 10 pages (854-863); vol. 32; Elsevier Ltd.

Archana Nair; Acoustic Emission Monitoring of Bridges: Review and Case Studies; Engineering Structures; 2010; 11 pages (1704-1714); vol. 32; Elsevier Ltd.

Xiedong Zhang et al.; Damage Identification in Cable-Stayed Bridge Based on Modal Analysis and Neural Networks; Review of Quantative Nondestructive Evaluation; 2007; 9 pages (1435-1442); vol. 26.

Z. X. Li et al.; Fatigue Analysis and Life Prediction of Bridges with Structural Health Monitoring Data—Part I: Methodology and Strategy; International Journal of Fatigue; 2001; 9 pages (45-53); vol. 23; Elsevier Science Ltd.

Farhad Ansari; Practical Implementation of Optical Fiber Sensors in Civil Structural Health Monitoring; Journal of Intelligent Material Systems and Structures; Aug. 2007; 11 pages (879-889); vol. 18; SAGE Publications.

Daniele Inaudi; Overview of 40 Bridge Structural Health Monitoring Projects; research paper; known prior to Nov. 16, 2011; 8 pages.

R C Tennyson et al.; Structural Health Monitoring of Innovative Bridges in Canada with Fiber Optic Sensors; Smart Mater. Struct.; 2001; 14 pages (560-573); vol. 10; IOP Publishing Ltd., United Kingdom.

T.H.T. Chan et al.; Fiber Bragg Grating Sensors for Structural Health Monitoring of Tsing Ma Bridge: Background and Experimental Observation; Engineering Structures; 2006; 12 pages (648-659); vol. 28; Elsevier Ltd.

J.M. Ko et al.; Technology Developments in Structural Health Monitoring of Large-Scale Bridges; Engineering Structures; 2005; 11 pages (1715-1725); vol. 27; Elsevier Ltd.

F. Necati Catbas et al.; Structural Health Monitoring and Reliability Estimation: Long Span Truss Bridge Application with Environmental Monitoring Data; Engineering Structures; 2008; 13 pages (2347-2359) vol. 30; Elsevier Ltd.

Philip ST J. Russell et al.; Fibre Gratings; known prior to Nov. 16, 2011; 6 pages.

Farhad Ansari; Fiber Optic Health Monitoring of Civil Structures Using Long Gage and Acoustic Sensors; Smart Materials and Structures; 2005; 7 pages (S1-S7); vol. 14; IOP Publishing Ltd., United Kingdom.

Shenfang Yuan et al.; Optic Fiber-Based Dynamic Pressure Sensor for WIM System; Sensors and Actuators A/Physical; 2005; 6 pages (53-58); vol. 120; Elsevier B.V.

Seyed Asadollah Bassam et al.; Post-Seismic Structural Health Monitoring of a Column Subjected to Near Source Ground Motions; Journal of Intelligent Material Systems and Structures; Oct. 2008; 10 pages (1163-1172); vol. 19; SAGE Publications.

Wei Zhang et al.; The Strain Field Method for Structural Damage Identification Using Brillouin Optical Fiber Sensing; Smart Materials and Structures; 2007; 8 pages (843-850; vol. 16; IOP Publishing Ltd., United Kingdom.

F. Ansari; Structural Health Monitoring with Fiber Optic Sensors; Front. Mech. Eng. China; 2009; 8 pages (103-110); vol. 4(2).

Q. Wang et al.; A Curve Fitting Signal Processing Scheme for a White-Light Interferometric System with a Synthetic Source; research paper; 1998; 6 pages (371-376); Elsevier Science Ltd., Great Britain.

Yang Zhao et al.; Quasi-Distributed Fiber-Optic Strain Sensor: Principle and Experiment; Applied Optics; Jul. 2001; 6 pages (3176-3181); vol. 40, No. 19.

R. Maaskant et al.; Fiber-Optic Bragg Grating Sensors for Bridge Monitoring; Cement and Concrete Composites; 1997; 13 pages (21-33); vol. 19; Elsevier Science Limited, Great Britain.

* cited by examiner

HIGH RESOLUTION LARGE DISPLACEMENT/CRACK SENSOR

STATEMENT REGARDING FEDERALLY SPONSORED RESEARCH AND DEVELOPMENT

This invention was made with Government support under Grant Number 0523333, awarded by the National Science Foundation. The Government has certain rights in this invention.

FIELD OF THE INVENTION

This invention generally relates to structural displacement sensors.

BACKGROUND OF THE INVENTION

In general, structural displacements and openings caused by cracks or deformations in civil structures are on the order of a few micrometers to a few centimeters. Conventionally, mechanical systems using springs and magnetic transduction methods or other similar techniques are employed to measure large displacements such as these. These systems are not easily deployable in some structures because of the lack of conformity with structural shapes. Further, these systems tend to have a low degree of resolution with respect to the displacement measurements. Strain-gauge-type systems, such as fiber optic Bragg gratings, are more easily deployed but are highly sensitive and enjoy high resolutions, such that their strain measurement range is small—on the order of 5,000 microstrains, which translates to a fraction of a millimeter once converted to displacement over their gauge length. The displacement measurement range for these strain monitoring systems is low when they are configured to be attached to straight mechanical elements. In this type of arrangement, the displacements due to crack openings are directly transferred to the strain gauge and provide a limited displacement range, i.e., 5,000 microstrains times the length of the mechanical element providing at best a fraction of millimeter in displacement range. Higher displacement readings may damage the strain sensor, or just simply are not transduced.

It would therefore be desirable to have a fiber optic system for measuring structural displacements and crack openings in civil structures that has a greater range of measurement than conventional displacement-measuring systems employing optical fibers.

The invention provides such a displacement-measuring system. These and other advantages of the invention, as well as additional inventive features, will be apparent from the description of the invention provided herein.

BRIEF SUMMARY OF THE INVENTION

In one aspect, embodiments of the invention provide a structural displacement sensor that includes an arched member having two ends, where each end is attached to a fastening member. In an embodiment of the invention, the fastening members are configured to be attached to a structure. Further, a strain gauge is attached to the arched member, and the strain gauge is operatively connected to a signal processing device. In an embodiment, the arched member and strain gauge are configured to measure a displacement in the structure based on the amount of strain detected on the strain gauge.

In another aspect, embodiments of the invention provide a structural displacement measurement system that includes a plurality of structural displacement sensors, where each structural displacement sensor is attached to a structure at a different location on the structure. In an embodiment, each of the plurality of structural displacement sensors has an arched member having two ends, where each end is attached to a fastening member. In a particular embodiment, a fiber Bragg grating strain gauge is attached to the arched member, and the fiber Bragg grating strain gauges are operatively coupled to an optical signal processing device. An amount of structural displacement distance in the structure is determined by using the optical signal processing device to measure the difference between the wavelength of an optical signal propagating through the fiber Bragg grating strain gauge after the structural displacement, and the wavelength of the optical signal before the structural displacement.

In yet another aspect, embodiments of the invention provide a method of measuring structural displacement that includes attaching a structural displacement sensor to a structure. In an embodiment of the invention, the structural displacement sensor includes an arched member having two ends, where each end is attached to a fastening member. The structural displacement sensor further includes a first strain gauge attached to the arched member, wherein the first strain gauge is operatively connected to a signal processing device. In an embodiment, the method of measuring structural displacement also includes coupling the first strain gauge to a signal processing device, measuring the strain placed on the first strain gauge, and calculating the structural displacement distance based on the strain measurement.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In an embodiment of the present invention, the shortcomings of conventional mechanical structural displacement systems are overcome through the use of a structural displacement sensor configured to de-amplify the effect of structural displacement on a non-mechanical, high-resolution, strain-gauge. As will be described more fully below, such non-mechanical, strain-gauge-type systems are well-suited for measuring structural displacement in large civil structures for example, such as bridges, multi-story buildings, dams, and various concrete structures. In a particular embodiment of the invention, the non-mechanical strain gauge is attached to an arched member, and the arched member secured to a location on the structure. The arched member is configured to de-amplify the strain placed on the strain gauge, thus allowing the strain gauge to measure strain over a larger dynamic range than would be possible if the strain gauge were affixed directly to the structure, or a straight element. By placing the strain gauge at the crown of the arch where the strain is at a minimum, it is possible to use a highly sensitive strain gauge and, depending on the size and shape of the arched member, it is possible to increase the displacement measurement range up to 10 mm or greater.

Figure 1:
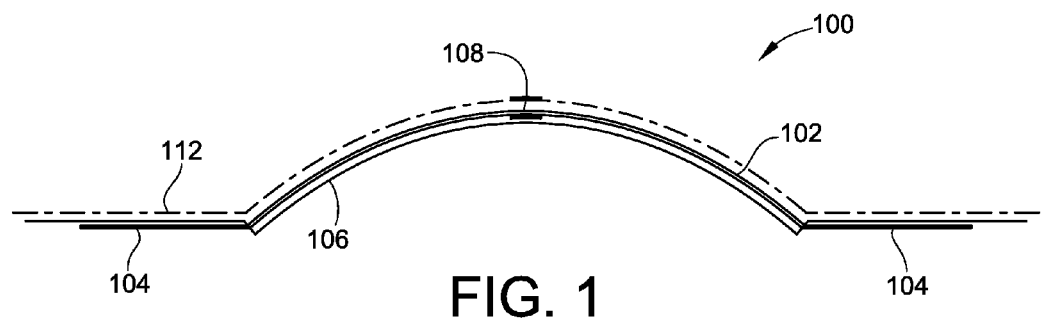
FIG. 1 is a side view of a structural displacement sensor, constructed in accordance with an embodiment of the invention.
Figure 2:
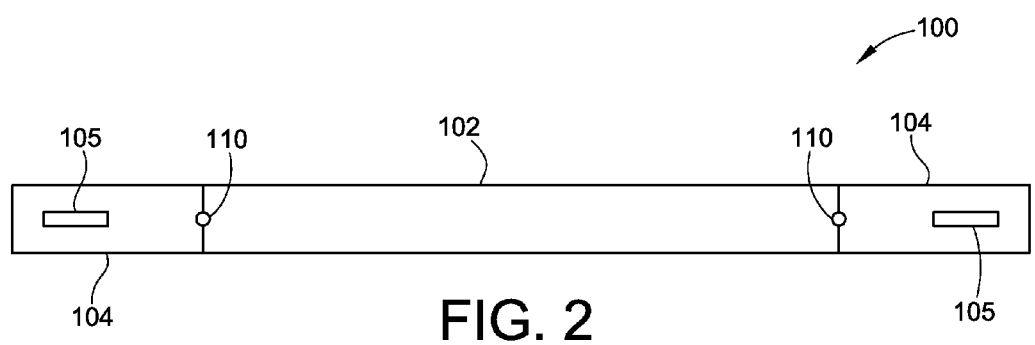
FIG. 2 is a top view of the structural displacement sensor of FIG. 1.

FIG. 1 illustrates a structural displacement sensor 100 according to an embodiment of the invention. The structural displacement sensor 100 includes an arched member 102, which, in at least one embodiment, comprises a thin strip of pliable material, such as spring steel for example, formed into the shape of an arch. However, it is also envisioned that the arched member 102 can be made from suitable materials other than spring steel. At each end of the arched member 102, there is attached a fastening member 104 for attaching the structural displacement sensor 100 to a structure (not shown) under evaluation. In at least one embodiment, the fastening member 104 is made of spring steel or some other suitable material having similar properties. Also, in particular embodiments of the invention, the fastening member 104 is flat and somewhat rigid, though it is contemplated that a relatively more flexible material could also be employed. In an alternate embodiment, the fastening member 104 is curvilinear to allow for attachment to rounded structures, such as columns, rounded beams, and curved walls for example. In a particular embodiment of the invention, the fastening member 104 has an opening 105 therein to facilitate the attachment of the sensor 100 to a concrete or metal structure (not shown), using nuts and bolts (not shown) for example. In another embodiment, the fastening member 104 can be attached to the structure using other means, such as adhesives.

Figure 3:
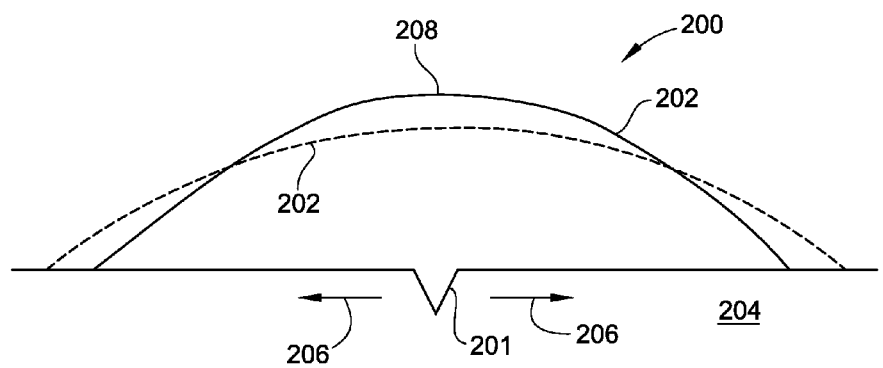
FIG. 3 is a schematic view showing the effect of structural displacement on the structural displacement sensor of FIG. 1.

FIG. 3 is a schematic diagram that shows the typical widening and flattening of an arched member 202 resulting from the movement of an exemplary structure 204 in the direction indicated by arrows 206. As can be seen, the structural displacement is caused by a crack 201 in the structure 204. The solid-line arch shows the arched member 202 before the structural displacement, while the broken-line arch shows the arched member 202 after the structural displacement. As stated, the arrows 206 show the direction of the displacement. The strain at the crown 208 of the arched member 202 is less than at any other point on the arched member 202, thus providing the de-amplification of strain that permits the increased range of measurement when using a high-resolution strain gauge.

Referring back to FIG. 1, a strain gauge 106 is affixed to the underside of the arched member 102 at a crown 108 of the arched member 102. The strain gauge 106 may be affixed to the arched member 102 using any suitable means that does not damage the strain gauge, such as adhesives. In at least one embodiment of the invention, the strain gauge 106 is routed through holes 110 in the arched member 102. Depending on the type of strain gauge 106 used, wires or optical fibers connect the strain gauge 106 to external devices (not shown) that provide power or signal processing capabilities. In some embodiments, the signal processing device, includes, but is not limited to, an optical interrogation unit, an electrical interrogation unit, a voltage meter and a current meter, which is coupled to the strain gauge 106 to measure the amount of strain placed on the strain gauge 106.

In one embodiment of the invention, the strain gauge 106 is an optical fiber, such as a fiber Bragg grating, wherein the fiber Bragg grating (FBG) is coupled to an FBG interrogator (not shown) at one end and it is capable of sending and receiving optical signals to the FBG from one end. When a crack or deformation occurs in a structure having an attached structural displacement sensor 100, depending on the nature of the deformation, the arched member 102 may widen and flatten or, in some instances, compress, thereby placing a mechanical strain on the strain gauge 106 attached to the crown 108 of the arched member 102. In the case where the strain gauge 106 is a fiber Bragg grating, the mechanical strain on the optical fiber caused by the structural displacement produces a slight, but detectable, change in the wavelength or frequency of an optical signal propagating through the fiber Bragg grating. The optical signal processing device determines the extent of the wavelength shift, as compared to the wavelength of an optical signal before the structural displacement. Based on the extent of the measured shift in wavelength, the amount of strain on the optical fiber and, therefore, the extent of the structural displacement can be calculated.

When using fiber Bragg gratings as strain gauges, it should be noted that temperature can affect the strain measurements from the strain gauge. These thermally-induced strains can introduce a degree of error into the strain measurements. With respect to the present invention, changes in temperature due to the change of season for example, may cause the results from a structural displacement sensor in an outdoor environment to overstate or understate the actual structural displacement. A particular embodiment of the invention is fashioned to reduce the effects of thermally-induced strain. Referring again to FIG. 1, a second fiber Bragg grating strain gauge 112 (shown in phantom) may be added to the structural displacement sensor as shown. The second fiber Bragg grating strain gauge 112 is attached to the top side of the crown 108 of the arched member 102. The first fiber Bragg grating strain gauge 106 is attached to the bottom side of the crown 108 of the arched member 102. When a structural displacement causes the arched member 102 to extend or contract, the two fiber Bragg grating strain gauges 106, 112 measure equal strains at any instant, but with opposite signs. But the thermally induced strains in the two sensors are equal. Therefore, by subtracting the strain measurement from of the second fiber Bragg grating strain gauge 112 from the strain measurement from of the first fiber Bragg grating strain gauge 106 and dividing the outcome in half, the effect of the thermal strains is removed from the measurement. The resulting figure is the strain due to the structural displacement.

In an alternate embodiment of the invention, the strain gauge 106 is a thin-film resistor that is connected to a voltage source (not shown) and a measurement device, such as a current meter or voltage meter (not shown). In this embodiment, when a crack is formed in the structure having the displacement sensor 100, the displacement causes the arched member 102 to widen and flatten, which places a mechanical strain on the thin-film resistor at the crown 108 of the arched member 102. The mechanical strain on the thin-film resistor produces a slight, but detectable, change in the resistance of the resistor. The current meter or voltage meter determines the amount of strain on the thin-film resistor and, therefore, the structural displacement, by evaluating the change in resistance.

Figure 4:
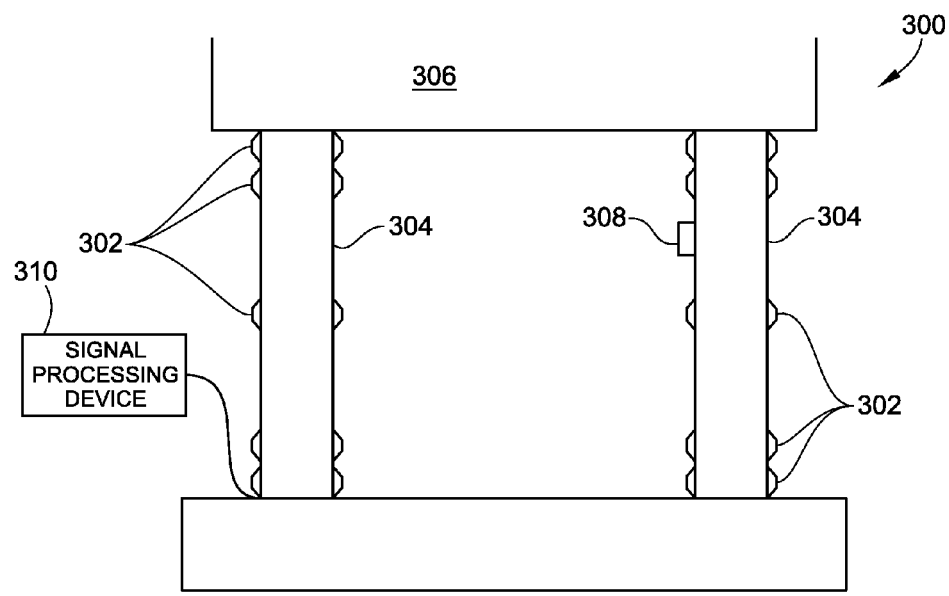
FIG. 4 is a schematic view a of strain measurement system incorporating an embodiment of the invention.

FIG. 4 is a schematic illustration of a strain measurement system 300 employing a plurality of structural displacement sensors 302. In the embodiment shown, the strain measurement system 300 includes twenty structural displacement sensors 302 evenly divided between two columns 304 that are part of, and supporting, a structure 306. The structural displacement sensors 302 are placed on different locations on the columns 304. In an embodiment of the invention, the strain gauges (not shown) for each of the structural displacement sensors 302 is a fiber Bragg grating strain gauge. In a particular embodiment, the strain gauges of the twenty structural displacement sensors 302 are connected in series and serially multiplexed at the optical signal processing device 310, which, in an embodiment of the invention, is also the generator, or source, of the optical signal. The optical signal processing device 310 could be located in or near the structure 306, however, it is also contemplated that the optical signal processing device 310 could be at a remote location, thus allowing the monitoring of multiple remote structures from a central location. In at least one embodiment, the strain measurement system 300 includes a fiber Bragg grating accelerometer 308 to measure vibrations in the structure 306. The fiber Bragg grating accelerometer 308 allows for monitoring of structural displacement related to seismic activity, for example, or from vibrations associated with use, such as might be caused by vehicle traffic on a bridge or elevated roadway.

Referring once again to FIG. 1, the structural displacement sensor 100 will typically be calibrated before use. For example, when using an optical fiber strain gauge 106, the wavelength shift for a given displacement may vary with the size and shape of the arched member 102, with the material used to fabricate the arched member 102, and with the specific type of fiber Bragg grating used. Similarly, with a thin-film resistor-type strain gauge 106, the shape, width, and length of the resistive element, or the material used to make the resistive element may affect the change in resistance for a given structural displacement. Hence, the need to calibrate the structural displacement sensor 100.

When calibrating a structural displacement sensor 100 with a fiber Bragg grating strain gauge 106, the calibration process typically calls for subjecting structural displacement sensor 100 to a displacement of a known distance and measuring the resulting shift in wavelength of an optical signal propagating through the fiber Bragg grating strain gauge 106. This process will result in the calculation of a gauge factor, which is defined as the displacement-induced change in the wavelength of the optical signal propagating in the fiber Bragg grating, divided by the displacement distance. In an embodiment in which the strain gauge is a thin-film resistor, the gauge factor may be defined as the displacement-induced change in the resistance of the thin-film resistor, divided by the known displacement distance.

Figure 5:
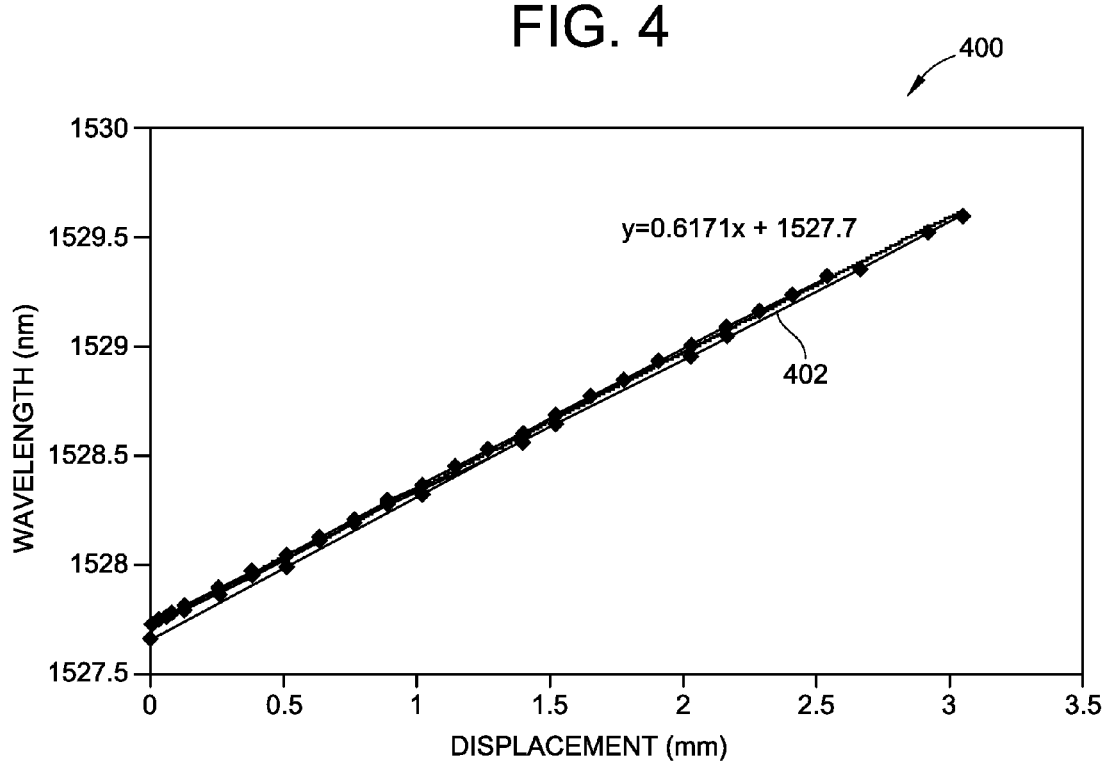
FIG. 5 is a graphical illustration of the wavelength shift seen in a fiber Bragg grating strain gauge as a function of displacement distance.

FIG. 5 is a graphical illustration of the wavelength shift of an optical signal as measured in an exemplary fiber Bragg grating strain gauge as a function of displacement distance, and shown by line 402. Such a graph 400 could be generated during the calibration process. As can be seen in FIG. 5, the wavelength of the optical signal in the fiber Bragg grating strain gauge is 1527.7 nanometers (nm) when there is no displacement of the structural displacement sensor. At one millimeter (mm) of displacement, the wavelength increases approximately 0.6 nm to 1528.3 nm. At 2 mm of displacement, the wavelength of the optical signal is approximately 1528.9 nm. and at 3 mm of displacement, the wavelength is approximately 1529.6. In this example, a 3 mm displacement causes about a 1.9 nm upward shift in the wavelength of the optical signal.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A structural displacement sensor having only a single arched member comprising:
   a single arched member having two ends, each end attached to a fastening member, wherein the fastening members are configured to attach to a structure;
   a first strain gauge attached to the arched member, wherein the first strain gauge is operatively connected to a signal processing device; and
   wherein the arched member and first strain gauge are configured to measure a displacement of the structure based on the amount of strain detected on the first strain gauge;
   wherein the first strain gauge is attached to the crown of the arched member, and wherein the arched member is configured to de-amplify the strain placed on the first strain gauge;
   wherein the first strain gauge comprises a fiber Bragg grating; and
   further comprising a second fiber Bragg grating strain gauge, wherein the first fiber Bragg grating strain gauge is attached to the top of the crown of the arched member, and the second fiber Bragg grating strain gauge is attached to the bottom of the crown of the arched member, such that analyzing signals from the two fiber Bragg grating strain gauges operates to reduce the effect of an thermally-induced strains in the two fiber Bragg grating strain gauges.

2. The structural displacement sensor of claim 1, wherein the amount of displacement in the structure can be determined by measuring the difference between the wavelength of an optical signal propagating through the first fiber Bragg grating strain gauge after the structural displacement, and the wavelength of the optical signal propagating through the first fiber Bragg grating strain gauge before the structural displacement.

3. The structural displacement sensor of claim 2, wherein a structural displacement of 3 millimeters results in a shift in the wavelength of the optical signal propagating through the first fiber Bragg grating strain gauge of between 1.4 and 2.4 nanometers.

4. The structural displacement sensor of claim 1, wherein the arched member is made from spring steel.

5. The structural displacement sensor of claim 1, wherein the fastening member is flat and configured to be attached to a flat surface of the structure.

6. The structural displacement sensor of claim 1, wherein the fastening member is curvilinear and configured to be attached to a rounded surface of the structure.

7. A structural displacement measurement system comprising:
a plurality of structural displacement sensors, each attached to a structure at a different location on the structure, wherein each of the plurality of structural displacement sensors comprises only a single arched member having two ends, each end attached to a fastening member, and a fiber Bragg grating strain gauge operating at a different wavelength from other fiber Bragg gratings attached to the arched member, wherein each of the fiber Bragg grating strain gauges is operatively coupled to a same optical signal processing unit, and wherein signals from two of the fiber Bragg gratings provide data for reducing the effect of thermally-induced strains in the two fiber Bragg grating strain gauges;
wherein displacement at various sections of the structure, to which individual displacement sensors are attached, can be separately acquired and distinguished from wavelength signatures of individual fiber Bragg gratings by using the optical signal processing unit to measure the difference between the wavelength of an individual optical signal propagating through the fiber Bragg grating strain gauge after the structural displacement, and the wavelength of the optical signal before the structural displacement.

8. The structural displacement measurement system of claim 7, wherein the plurality of fiber Bragg grating strain gauges are connected in series.

9. The structural displacement measurement system of claim 8, wherein the optical signals from the plurality of fiber Bragg grating strain gauges are serially multiplexed.

10. The displacement measurement system of claim 7, wherein each of the plurality of structural displacement sensors comprises a fiber Bragg grating strain gauge attached to the crown of the arched member, wherein the arched member is configured to de-amplify the strain placed on its corresponding fiber Bragg grating strain gauge.

11. The structural displacement measurement system of claim 7, wherein each structural displacement sensor is configured to measure a structural displacement of up to 10 millimeters.

12. A method of measuring structural displacement comprising the steps of:
attaching a structural displacement sensor having only a single arched member to a structure, the structural displacement sensor comprising:
the arched member having two ends, each end attached to a fastening member; and
a first strain gauge attached to the arched member, wherein the first strain gauge is a fiber Bragg grating strain gauge;
coupling the first strain gauge to a signal processing device;
measuring the strain placed on the first strain gauge; and
calculating the structural displacement distance based on the strain measurement; and
attaching the first fiber Bragg strain gauge to the top of a crown of the arched member, and attaching a second fiber Bragg grating strain gauge to the bottom of the crown of the arched member, such that analyzing signals from the two fiber Bragg grating strain gauges operates to reduce the effect of any thermally-induced strains in the two fiber Bragg grating strain gauges.

13. The method of claim 12, wherein attaching a structural displacement sensor to a structure comprises attaching a structural displacement sensor having an arched member made of spring steel to a structure.

14. The method of claim 12, further comprising attaching a plurality of structural displacement sensors, each having a fiber Bragg grating strain gauge, to a structure, wherein the fiber Bragg grating strain gauges for the plurality of structural displacement sensors are coupled in series.

15. The method of claim 14, further comprising serially multiplexing the optical signals from the plurality of fiber Bragg grating strain gauges.

16. The method of claim 12, wherein calculating the structural displacement distance based on the strain measurement comprises measuring the difference between the wavelength of an optical signal propagating through the first fiber Bragg grating strain gauge after the structural displacement, and the wavelength of the optical signal propagating through the first fiber Bragg grating strain gauge before the structural displacement.

17. The method of claim 12, further comprising calibrating the structural displacement sensor, wherein calibrating the structural displacement sensor requires only the calibration of a single strain gauge.

18. The method of claim 12, further comprising de-amplifying the strain gauge signal.

19. The method of claim 18, further comprising:
attaching at least 25 plurality of structural displacement sensors to the structure, each structural displacement sensor having a corresponding fiber Bragg grating strain gauge, wherein the fiber Bragg grating strain gauges are all coupled in series; and
serially multiplexing optical signals from each of the fiber Bragg grating strain gauges.

* * * * *

UNITED STATES PATENT AND TRADEMARK OFFICE
CERTIFICATE OF CORRECTION

| | | |
|---|---|---|
| PATENT NO. | : 9,109,883 B2 | Page 1 of 1 |
| APPLICATION NO. | : 13/320885 | |
| DATED | : August 18, 2015 | |
| INVENTOR(S) | : Farhad Ansari et al. | |

It is certified that error appears in the above-identified patent and that said Letters Patent is hereby corrected as shown below:

In the Claims

In column 8, line 19, after the word "Bragg", insert the word --grating--.

Signed and Sealed this
Nineteenth Day of January, 2016

Michelle K. Lee
*Director of the United States Patent and Trademark Office*